United States Patent
Jones et al.

(10) Patent No.: US 12,258,142 B2
(45) Date of Patent: Mar. 25, 2025

(54) SYSTEM AND METHOD FOR REDUCING THE CONCENTRATION OF FUEL VAPOR IN THE ULLAGE OF A FUEL TANK

(71) Applicant: EATON INTELLIGENT POWER LIMITED, Dublin (IE)

(72) Inventors: Matthew Darren Jones, Fareham (GB); Subrata Sarkar, Maharashtra (IN)

(73) Assignee: Eaton Intelligent Power Limited, Dublin (IE)

( * ) Notice: Subject to any disclaimer, the term of this patent is extended or adjusted under 35 U.S.C. 154(b) by 438 days.

(21) Appl. No.: 17/729,950

(22) Filed: Apr. 26, 2022

(65) Prior Publication Data

US 2022/0340295 A1 Oct. 27, 2022

(30) Foreign Application Priority Data

Apr. 27, 2021 (IN) .............................. 202111019367

(51) Int. Cl.
| | |
|---|---|
| *B01D 53/02* | (2006.01) |
| *B01D 53/00* | (2006.01) |
| *B64D 33/08* | (2006.01) |
| *B64D 37/00* | (2006.01) |
| *F25J 3/06* | (2006.01) |

(52) U.S. Cl.
CPC ............ *B64D 37/00* (2013.01); *B01D 53/002* (2013.01); *B64D 33/08* (2013.01); *F25J 3/0605* (2013.01); *F25J 2240/02* (2013.01)

(58) Field of Classification Search
CPC .......... B01D 53/002; B64D 2013/0659; B64D 33/08; B64D 37/00; B64D 37/32; F25J 2240/02; F25J 3/0605
See application file for complete search history.

(56) References Cited

U.S. PATENT DOCUMENTS

| | | | |
|---|---|---|---|
| 3,158,197 A | 11/1964 | Blezard | |
| 3,847,298 A * | 11/1974 | Hamilton | ................. B01J 19/14 |
| | | | 252/372 |
| 7,918,358 B2 | 4/2011 | Gupta | |
| (Continued) | | | |

OTHER PUBLICATIONS

Spanish Search Report for Application No. 202230381 dated Oct. 11, 2022.

*Primary Examiner* — Christopher P Jones
(74) *Attorney, Agent, or Firm* — Merchant and Gould, PC

(57) ABSTRACT

The present disclosure relates generally to a system for removing fuel from a mixture of air and fuel vapor in an ullage space of an aircraft fuel tank. The system includes a compressor for drawing the mixture of air and fuel vapor from the ullage space and directing the mixture of air and fuel vapor through a heat exchanger where the mixture of air and fuel vapor is cooled. The system also includes a turbine configured to be driven by the mixture of air and fuel from the heat exchanger. Power from the turbine can be transferred back toward the compressor to assist in driving rotation of the compressor. The system further includes a separator for receiving the mixture of air and fuel vapor from the turbine and separating at least some liquid fuel from the mixture of air and fuel vapor. From the separator, a separated liquid fuel and a mixture of air and fuel vapor with reduced concentration of fuel vapor are returned to the aircraft fuel tank.

10 Claims, 2 Drawing Sheets

(56) References Cited

U.S. PATENT DOCUMENTS

| | | |
|---|---|---|
| 7,955,424 B2 | 6/2011 | Gupta |
| 8,128,739 B1 | 3/2012 | Gupta |
| 8,192,532 B1 | 6/2012 | Gupta |
| 8,808,428 B2 | 8/2014 | Gupta |
| 9,016,078 B2 | 4/2015 | Gupta |
| 9,114,886 B2 | 8/2015 | Gupta |
| 2004/0194848 A1 | 10/2004 | Sauer |
| 2012/0325811 A1 | 12/2012 | Hagh et al. |
| 2013/0126193 A1* | 5/2013 | Gupta .................... B64D 37/32 169/56 |
| 2013/0341465 A1 | 12/2013 | Massey et al. |
| 2018/0050300 A1* | 2/2018 | Rheaume ............. B01D 53/326 |
| 2018/0229853 A1* | 8/2018 | Sarkar ................... B01D 53/81 |

\* cited by examiner

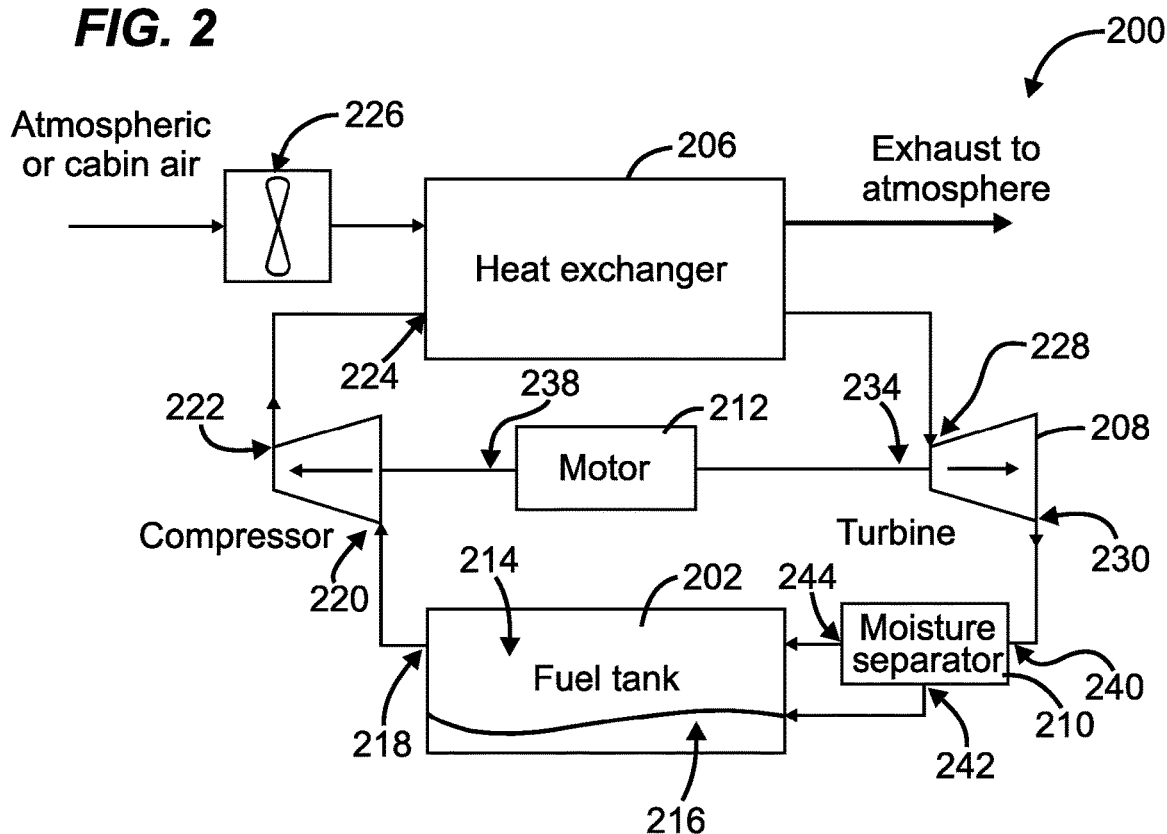
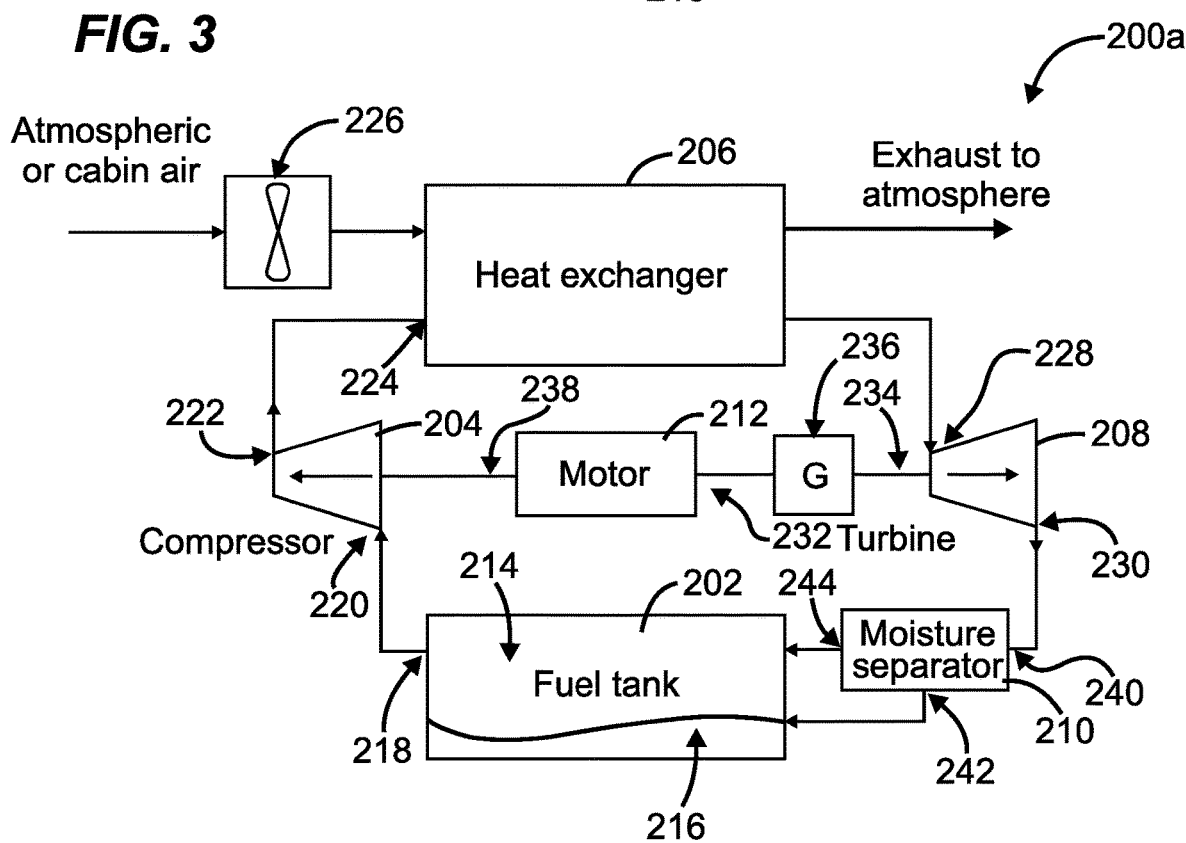

SYSTEM AND METHOD FOR REDUCING THE CONCENTRATION OF FUEL VAPOR IN THE ULLAGE OF A FUEL TANK

CROSS-REFERENCE TO RELATED APPLICATION

This application claims the benefit of Indian Provisional Patent Application No. 202111019367, filed on Apr. 27, 2021, the disclosure of which is incorporated herein by reference in its entirety.

TECHNICAL FIELD

The present disclosure relates generally to a system and method for making a fuel tank ullage non-flammable and more particularly to a system and method for reducing the concentration of fuel vapor in the ullage of a fuel tank.

BACKGROUND

It is well known to treat the ullage (i.e., the portion of a tank above the liquid) of an aircraft fuel tank to prevent the tank from combusting. In these types of aircraft fuel tanks, it is desirable to keep the concentration of fuel in the ullage mixture at a low level. Systems have been developed to enhance fuel tank safety. Example systems are described in U.S. Pat. Nos. 7,918,358, 9,016,078, and 7,955,424, and U.S. Patent Publication No. US20130341465.

It is well known to use one or more filters or 'air separation modules' (ASMs) which allow separation of a supply of inlet air into a nitrogen-enriched air portion (NEA) and an oxygen-enriched air portion (OEA). In order to run air separation modules efficiently, they need to be supplied with inlet air at a relatively high pressure (typically 40 psig ($2.76 \times 10^5$ Pag) or more). It is possible to operate at lower pressures, but this would mean that more air separation modules would be required with the consequent increase in weight and complexity, which is undesirable.

Some conventional flammability reduction systems displace the air in the ullage space with inert nitrogen enriched air which is generated using an air separation device such as a system using hollow fiber membranes. The hollow fiber membrane technology can be used to separate air into oxygen and nitrogen, and to provide nitrogen-enriched air in which the concentration of nitrogen is greater than in ambient air, and the concentration of oxygen is lower. These systems can be complex and have life limited components which may lead to significant ownership costs.

There is a need for improved systems for effectively removing fuel vapor such that the vapor-air mixture in the ullage of a fuel tank is non-flammable.

SUMMARY

The systems and methods describe herein have features that make a fuel tank ullage gas mixture non-flammable by removing fuel vapor from the fuel tank to maintain the ullage gas mixture below the lower flammability limit specified by Federal Aviation Administration (FAA) Regulations. Regulations require that the fuel tanks of civil aircraft are rendered inert, that is to say that the flammability hazard posed by the fuel tank is reduced.

Aspects of the present disclosure relate to an improved aircraft system for enhancing fuel tank safety. The system may also include one or more of the following features individually or in non-exclusive combinations.

The system includes a fuel tank with an ullage gas mixture in an ullage region and a quantity of fuel in a fuel region and a compressor that has a compressor inlet in fluid communication with the fuel tank for receiving a portion of the ullage gas mixture from the fuel tank. During operation the compressor increases the pressure and temperature of the ullage gas mixture.

The system can include a heat exchanger positioned downstream from the compressor. The compressor includes a compressor outlet in fluid communication with a heat exchanger inlet where the compressor outlet is operable in use to supply the compressed ullage gas mixture to the heat exchanger. The ullage gas mixture is passed through the heat exchanger that is cooled by atmospheric or cabin waste air.

The system can include a turbine positioned downstream from the heat exchanger. The turbine has a turbine inlet for receiving the ullage gas mixture where the ullage gas mixture expands through the turbine and the ullage gas mixture has a temperature below tank temperature such that fuel vapor in the ullage gas mixture condenses to liquid fuel. The turbine includes a turbine outlet for passing the ullage gas mixture out of the turbine into a moisture separator.

The moisture separator has a moisture separator inlet in fluid communication with the turbine outlet and first and second moisture separator outlets in fluid communication with the fuel tank. The moisture separator is operable in use to separate the liquid fuel from the ullage gas mixture. The liquid fuel flows through the first moisture separator of the moisture separator outlet back into the fuel tank and the ullage gas mixture flows from the moisture separator through the second moisture separator outlet back into the fuel tank.

The system includes an energy transfer arrangement that allows energy to be recovered from the turbine and transferred back to the compressor for driving the compressor.

Aspects of the present disclosure also relate to a method of reducing the concentration of fuel vapor in the ullage of aircraft fuel tank. The method can include the following sequence of operations: receiving a portion of ullage gas mixture from the aircraft fuel tank via a compressor in fluid communication with the aircraft fuel tank; channeling the portion of ullage gas mixture towards a heat exchanger downstream from the compressor where the heat exchanger is in fluid communication with the compressor; removing thermal energy from the portion of ullage gas mixture at the heat exchanger; expanding the portion of ullage gas mixture through a turbine such that the ullage gas mixture has a temperature below tank temperature and fuel vapor in the ullage gas mixture condenses to liquid fuel; passing the ullage gas mixture out of the turbine into a moisture separator in which the moisture separator has first and second moisture separator outlets in fluid communication with the aircraft fuel tank; separating the liquid fuel from the ullage gas mixture where the liquid fuel flows from the moisture separator through the first moisture separator outlet into the aircraft fuel tank and the ullage gas mixture flows from the moisture separator through the second moisture separator outlet into the aircraft fuel tank; and recovering energy from the turbine via an energy transfer arrangement, wherein the energy is transferred back to the compressor for driving the compressor.

These and other features and advantages will be apparent from a reading of the following detailed description and a review of the associated drawings. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 2 illustrates a schematic view of a system used to reduce the concentration of fuel vapor in ullage of a fuel tank in accordance with the principles of the present disclosure; and FIG. 3 illustrates schematic view of another system that includes a gear set in accordance with the principles of the present disclosure.

DETAILED DESCRIPTION

Figure 1:
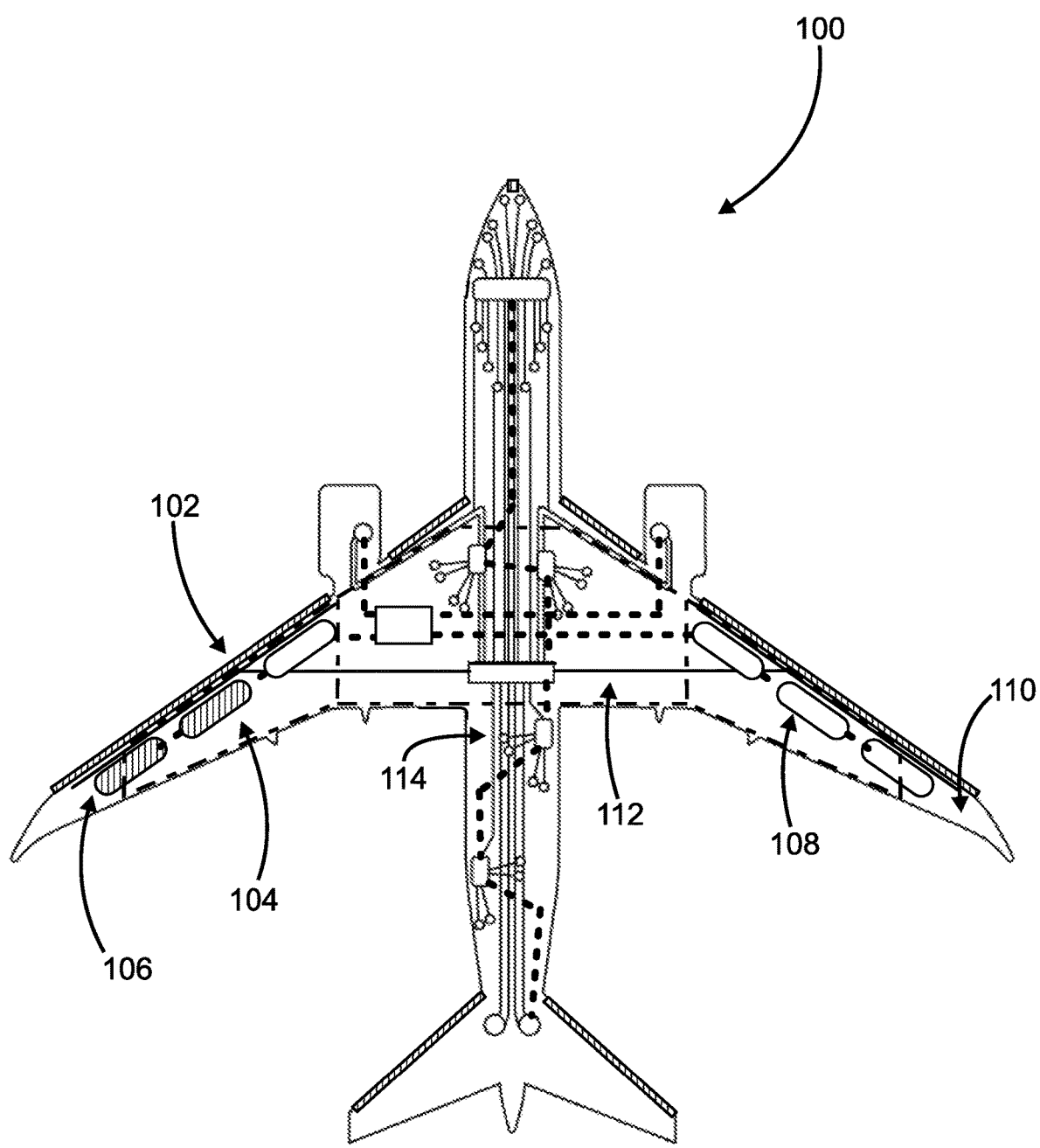
FIG. 1 illustrates a cross-sectional top view of an exemplary aircraft with an exemplary aircraft fuel system in accordance with principles of the present disclosure.

Reference will now be made in detail to the exemplary aspects of the present disclosure that are illustrated in the accompanying drawings. Wherever possible, the same reference numbers will be used throughout the drawings to refer to the same or like structure.

The systems and methods described herein have features that continuously extract a proportion of ullage gas mixture from a fuel tank to remove fuel vapor and ensure that the ullage gas mixture is below the lower flammability limit specified by Federal Aviation Administration (FAA) Regulations. The fuel vapor in the system is condensed to liquid fuel to be separated and returned to the fuel tank. Additionally, the system functions with an energy transfer arrangement that allows energy to be recovered in the system.

FIG. 1 illustrates an example top view of an aircraft 100 that includes an exemplary system 102 for reducing the concentration of fuel vapor in ullage of a fuel tank. Although the exemplary system 102 is shown applicable to an aircraft, it would be understood that the principles of the present disclosure can be applied to reduce the flammability of any fuel tank.

The system 102 includes a first fuel tank 104 that occupies most of a first wing volume 106 of the aircraft 100, a second fuel tank 108 that occupies most of a second wing volume 110 of the aircraft 100, and a center fuel tank 112 positioned within an aircraft fuselage 114. In certain examples, the fuel tanks of the aircraft may have an alternative arrangement while still allowing the aircraft 100 to function as described herein. In certain examples, the first fuel tank 104, the second fuel tank 108 and the center fuel tank 112 each include the system 100 described herein for reducing fuel vapor content within each fuel tank. In other examples, the system 100 may be used for the first fuel tank 104, the second fuel tank 108 and the center fuel tank 112. The system 100 makes a fuel tank ullage non-flammable by removing fuel vapor such that the vapor-air mixture is below a lower flammability limit. As such, a fuel tank ullage can be non-flammable when equal to or less than a lower flammability limit.

FIG. 2 is a schematic illustration of an example system 200 used on the aircraft 100 shown in FIG. 1 for making a fuel tank ullage non-flammable by reducing the concentration of fuel vapor in ullage of a fuel tank. The system 200 includes a fuel tank 202, a compressor 204, a heat exchanger 206, an expansion turbine 208, a moisture separator 210, and a motor 212. In certain examples, the motor 212 is an electrical motor.

The fuel tank 202 includes an ullage gas mixture (i.e., mixture of fuel and air) in an ullage region 214 and a quantity of fuel in a fuel region 216. During system operations, the ullage gas mixture can be withdrawn from an outlet 218 of the fuel tank 202 by the compressor 204. The compressor 204 has a compressor inlet 220 that is in fluid communication with the fuel tank 202 to receive a portion of the ullage gas mixture. In certain examples, the compressor 204 may be a positive displacement compressor or pump. The ullage gas mixture is compressed by the compressor 204 which increases the pressure and temperature of the ullage gas mixture. The compressor 204 supplies the ullage gas mixture to the heat exchange 206 via a compressor outlet 222. In certain examples, a drive shaft of the compressor 204 is driven by an electric motor.

The heat exchanger 206 is positioned downstream from the compressor 204. The compressor outlet 222 is in fluid communication with a heat exchanger inlet 224. The compressor outlet 222 is operable in use to supply the ullage gas mixture to the heat exchanger 206 via the heat exchanger inlet 224. Atmospheric or cabin waste air can be channeled through the heat exchanger 206 for cooling. The heat exchanger 206 functions to reduce a temperature of the ullage gas mixture. An air fan 226 may be incorporated in the system 200 to boost the flow rate of the cabin air to the heat exchanger 206 when cabin pressure is insufficient to provide the required cooling flow or to promote the flow of atmospheric air through the heat exchanger 206. The cooling air absorbs heat from the high pressure and temperature ullage gas mixture to be discharged out of the system 200.

The coupling of the expansion turbine 208 to the compressor 204 and the inclusion of the motor 212 to boost the power required to drive the compressor 204 will now be described.

The expansion turbine 208 is positioned downstream from the heat exchanger 206. The expansion turbine 208 has a turbine inlet 228 for receiving the ullage gas mixture. The expansion turbine 208 is configured to be driven by the ullage gas mixture from the heat exchanger 206. The ullage gas mixture expands through the expansion turbine 208 to a temperature below tank temperature such that fuel vapor in the ullage gas mixture condenses to liquid fuel. The ullage gas mixture also expands to a lower pressure. The expansion turbine 208 includes a turbine outlet 230 for passing the ullage gas mixture out of the expansion turbine 208. The expansion turbine 208 may generate power for the compressor 204. That is, power from the expansion turbine 208 can be transferred back toward the compressor 204 to assist in driving rotation of the compressor 204. The compressor 204 may be driven at least partially or wholly by shaft power supplied from the expansion turbine 208.

The system 200 can include an energy transfer arrangement 232 designed to recover energy from the expansion turbine 208 to be transferred back to the compressor 204 for driving the compressor 204. The energy transfer arrangement 232 can include the motor 212 coupled to the system 200 between the expansion turbine 208 and the compressor 204 to provide additional power for driving the compressor 204.

In certain examples, an output shaft 234 of the expansion turbine 208 is connected via the motor 212 to the drive shaft of the compressor 204. In certain examples, the output shaft 234 of the expansion turbine 208 has a direct shaft connection to the drive shaft of the compressor 204. In other examples, the output shaft 234 of the expansion turbine 208 can be connected to the compressor 204 via a gear set 236 (see FIG. 3), such as a planetary gear set or other type of gear set. One end of the output shaft 234 of the expansion turbine 208 can connect to the gear set 236.

The motor 212 can have one motor shaft 238 going therethrough such that one end of the motor shaft 238 connects to either the expansion turbine 208 or to the gear set 236 and an opposite end of the motor shaft 238 connects to the compressor 204. In certain examples, the motor shaft 238 may also have a gear to intermesh with the gear set 236 that is connected to the output shaft 234 of the expansion turbine 208. As such, the motor shaft 238 and the output shaft 234 are not required to spin at the same speed allowing the gear ratio to be changed. The gear set 234 can provide a smooth transition between the driving ratios. In other examples, a battery which may be charged by the motor 212 to provide back-up or supplemental power to the electric motor.

The liquid fuel condensed out of the expansion turbine 208 can be separated from the fuel vapor in the moisture separator 210. The moisture separator 210 can include a moisture separator inlet 240 in fluid communication with the turbine outlet 230, a first moisture separator outlet 242, and a second moisture separator outlet 244. The first and second moisture separator outlets 242, 244 can be in fluid communication with the fuel tank 202 to provide a closed loop system.

The moisture separator 210 is operable in use to separate the liquid fuel from the ullage gas mixture while returning both separately to the fuel tank 202. From the moisture separator 210, a separated liquid fuel and ullage gas mixture of air and fuel vapor with a reduced concentration of fuel vapor are returned to the aircraft fuel tank separately. That is, the liquid fuel can flow through the first moisture separator outlet 242 of the moisture separator 210 back into the fuel tank 202 and the ullage gas mixture can flow from the moisture separator 210 through the second moisture separator outlet 244 back into the fuel tank 202. coupling of the turbine to the compressor and the inclusion of the motor to boost the power required to drive the compressor Another aspect of the present disclosure relates to a method of making a fuel tank ullage non-flammable by reducing the concentration of fuel vapor in ullage of an aircraft fuel tank. The method can include a sequence of operations that include the following: 1) receiving a portion of ullage gas mixture from the aircraft fuel tank via a compressor in fluid communication with the aircraft fuel tank; 2) channeling the portion of ullage gas mixture towards a heat exchanger downstream from the compressor, where the heat exchanger is in fluid communication with the compressor; 3) removing thermal energy from the portion of ullage gas mixture at the heat exchanger; 4) expanding the portion of ullage gas mixture through a turbine such that the ullage gas mixture has a temperature below tank temperature and fuel vapor in the ullage gas mixture condenses to liquid fuel; 5) passing the ullage gas mixture out of the turbine into a moisture separator where the moisture separator has first and second moisture separator outlets in fluid communication with the aircraft fuel tank; 6) separating the liquid fuel from the ullage gas mixture where the liquid fuel flows from the moisture separator through the first moisture separator outlet into the aircraft fuel tank and the ullage gas mixture flows from the moisture separator through the second moisture separator outlet into the aircraft fuel tank; and 7) recovering energy from the turbine via an energy transfer arrangement where the energy is transferred back to the compressor for driving the compressor.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:

1. A method of reducing the concentration of fuel vapor in ullage of an aircraft fuel tank, the method comprising:
receiving a portion of ullage gas mixture from the aircraft fuel tank via a compressor in fluid communication with the aircraft fuel tank;
channeling the portion of ullage gas mixture towards a heat exchanger downstream from the compressor, wherein the heat exchanger is in fluid communication with the compressor;
removing thermal energy from the portion of ullage gas mixture at the heat exchanger;
expanding the portion of ullage gas mixture through a turbine such that the ullage gas mixture has a temperature below tank temperature and fuel vapor in the ullage gas mixture condenses to liquid fuel;
passing the ullage gas mixture out of the turbine into a moisture separator, the moisture separator having first and second moisture separator outlets in fluid communication with the aircraft fuel tank;
separating the liquid fuel from the ullage gas mixture, wherein the liquid fuel flows from the moisture separator through the first moisture separator outlet into the aircraft fuel tank and the ullage gas mixture flows from the moisture separator through the second moisture separator outlet into the aircraft fuel tank; and
recovering energy from the turbine via an energy transfer arrangement, wherein the energy is transferred back to the compressor for driving the compressor.

2. The method of claim 1, wherein, in the step of receiving a portion of ullage gas mixture via the compressor, a temperature and a pressure of the ullage gas mixture increases.

3. The method of claim 1, wherein, in the step of channeling the portion of ullage gas mixture towards the heat exchanger, the heat exchanger is cooled by atmospheric or cabin waste air.

4. The method of claim 1, wherein the energy transfer arrangement includes a motor between the turbine and the compressor.

5. The method of claim 4, wherein the motor includes a motor shaft that goes therethrough, wherein one end of the motor shaft is connected to the compressor.

6. The method of claim 5, wherein an opposite end of the motor shaft is connected to the turbine.

7. The method of claim 6, further comprising: driving, by the motor, the compressor, wherein power from the turbine assists the motor in driving the compressor.

8. The method of claim 5, wherein an opposite end of the motor shaft is connected to a gear set.

9. The method of claim 8, wherein the gear set is a planetary gear set.

10. The method of claim 4, further comprising charging, by the motor, a battery with excess energy.

* * * * *